United States Patent
Lopez et al.

(10) Patent No.: US 10,361,893 B2
(45) Date of Patent: Jul. 23, 2019

(54) RADIO NETWORK NODE, WIRELESS DEVICE AND METHODS THEREOF USING GMSK MODULATION APPLYING NEGATIVE MODULATION INDEX

(71) Applicant: Telefonaktiebolaget LM Ericsson (publ), Stockholm (SE)

(72) Inventors: Miguel Lopez, Solna (SE); Mårten Sundberg, Årsta (SE); Olof Liberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/327,600

(22) PCT Filed: Aug. 20, 2015

(86) PCT No.: PCT/SE2015/050887
§ 371 (c)(1),
(2) Date: Jan. 19, 2017

(87) PCT Pub. No.: WO2016/028215
PCT Pub. Date: Feb. 25, 2016

(65) Prior Publication Data
US 2017/0180173 A1    Jun. 22, 2017

Related U.S. Application Data
(60) Provisional application No. 62/039,489, filed on Aug. 20, 2014.

(51) Int. Cl.
*H04L 27/20*    (2006.01)
*H04L 27/233*   (2006.01)
(Continued)

(52) U.S. Cl.
CPC .......... *H04L 27/201* (2013.01); *H04B 1/707* (2013.01); *H04L 1/0054* (2013.01);
(Continued)

(58) Field of Classification Search
CPC ................. H04L 27/201; H04L 1/0054; H04L 25/03834; H04L 27/2014; H04L 27/2017; H04L 27/233; H04B 1/707
See application file for complete search history.

(56) References Cited

U.S. PATENT DOCUMENTS 7,065,157 B2 *  6/2006  O'Shea ............. H04L 25/03834
                                                    332/100
2005/0089110 A1  4/2005  Norris
(Continued)

FOREIGN PATENT DOCUMENTS

EP    2237513 A1   10/2010

OTHER PUBLICATIONS

Author Unknown, "Technical Specification Group GSM/EDGE Radio Access Network; Physical layer on the radio path; General description (Release 11)," Technical Specification 45.001, Version 11.0.0, 3GPP Organizational Partners, Sep. 2012, 44 pages.
(Continued)

*Primary Examiner* — Sophia Vlahos
(74) *Attorney, Agent, or Firm* — Sage Patent Group

(57) ABSTRACT

A radio network node comprised, and a wireless device configured to be operative, in a wireless communication system. The radio network node obtains downlink data and converts it to a baseband signal. The conversion comprises Gaussian Minimum Shift Keying (GMSK) modulation of the downlink data. The modulation applies a negative modulation index selected based on a type of wireless device that is a target for the downlink data. A radio signal is provided based on the baseband signal and sent to, and received by,
(Continued)

the wireless device that provides user data based on the radio signal.

16 Claims, 10 Drawing Sheets

(51) Int. Cl.
    *H04B 1/707*     (2011.01)
    *H04L 1/00*     (2006.01)
    *H04L 25/03*     (2006.01)

(52) U.S. Cl.
    CPC .... *H04L 25/03834* (2013.01); *H04L 27/2014* (2013.01); *H04L 27/2017* (2013.01); *H04L 27/233* (2013.01)

(56) References Cited

U.S. PATENT DOCUMENTS

| | | | |
|---|---|---|---|
| 2010/0309959 A1 | 12/2010 | Lakkis | |
| 2010/0310009 A1 | 12/2010 | Lakkis | |
| 2013/0203461 A1* | 8/2013 | Li | H04W 88/06 455/552.1 |
| 2013/0272273 A1 | 10/2013 | Lopez et al. | |

OTHER PUBLICATIONS

Author Unknown, "Technical Specification Group GSM/EDGE Radio Access Network; Multiplexing and multiple access on the radio path (Release 11)," Technical Specification 45.002, Version 11.0.0, 3GPP Organizational Partners, Aug. 2012, 112 pages.

Author Unknown, "Technical Specification Group GSM/EDGE Radio Access Network; Channel coding (Release 11)," Technical Specification 45.003, Version 11.0.0, 3GPP Organizational Partners, Sep. 2012, 321 pages.

Author Unknown, "Technical Specification Group GSM/EDGE Radio Access Network; Modulation (Release 11)," Technical Specification 45.004, Version 11.0.0, 3GPP Organizational Partners, Sep. 2012, 18 pages.

Vodafone Group Plc., "GP-140421: New Study Item on Cellular System Support for Ultra Low Complexity and Low Throughput Internet of Things," 3rd Generation Partnership Project (3GPP), Work Item, Revision of GP-140418, TSG-GERAN Meeting #62, May 26-30, 2014, 6 pages, Valencia, Spain.

International Search Report and Written Opinion for International Patent Application No. PCT/SE2015/050887, dated Jan. 20, 2016, 11 pages.

Balint, Cornel et al., "System Model for Performance Evaluation VAMOS Downlink Transmission," International Conference on Optimization of Electrical and Electronic Equipment (OPTIM), May 22-24, 2014, Bran, Romania, IEEE, pp. 796-801.

Ericsson, "Tdoc GP-140297: GSM optimization for Internet of Things," 3rd Generation Partnership Project (3GPP), TSG GERAN #62, May 26-30, 2014, 16 pages, Valencia, Spain.

Ericsson, "Tdoc GP-140602: GSM Evolution for cellular Iot—SCH overview," 3rd Generation Partnership Project (3GPP), TSG GERAN#63, Aug. 25-29, 2014, 9 pages, Ljubljana, Slovenia.

European Search Report for European Patent Application No. 15833382.3, dated Jul. 14, 2017, 5 pages.

Examination Report for European Patent Application No. 15833382. 3, dated Jul. 28, 2017, 7 pages.

\* cited by examiner 1801
1503; 1703

1802
1503; 1703

1803
1503; 1703
1804
110; 121

RADIO NETWORK NODE, WIRELESS DEVICE AND METHODS THEREOF USING GMSK MODULATION APPLYING NEGATIVE MODULATION INDEX

This application is a 35 U.S.C. § 371 national phase filing of International Application No. PCT/SE2015/050887, filed Aug. 20, 2015, which claims the benefit of U.S. Provisional Application No. 62/039,489, filed Aug. 20, 2014, the disclosures of which are incorporated herein by reference in their entireties.

TECHNICAL FIELD

Embodiments herein relate to a radio network node, a wireless device and methods thereof. Downlink data is Gaussian Minimum Shift Keying (GMSK) modulated. The radio network node is comprised in and the wireless device operative in a wireless communication system, such as a telecommunications network that may be based on Global System for Mobile communication (GSM).

BACKGROUND

Communication devices such as wireless devices are also known as e.g. User Equipments (UEs), mobile terminals, wireless terminals and mobile stations (MSs). Wireless devices are enabled to communicate wirelessly in a cellular communication network, wireless communication network or wireless communications system, sometimes also referred to as a cellular radio system or a cellular network. The communication may be performed, e.g., between two wireless devices, between a wireless device and a regular telephone and/or between a wireless device and a server via a Radio Access Network (RAN), and possibly one or more core networks, comprised within the cellular communication network.

Wireless devices may further be referred to as mobile telephones, cellular telephones, laptops, or tablet computer with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The cellular communication network covers a geographical area which is divided into cell areas, wherein each cell area being served by an access node such as a base station (BS), e.g., a Radio Base Station (RBS), which sometimes may be referred to as e.g. "evolved Node B", "eNB", "eNodeB", "NodeB", "B node", "node B" or BTS (Base Transceiver Station), depending on the technology and terminology used. The base stations may be of different classes such as, e.g., macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Special Mobile). EDGE, often referred to as GSM EDGE or GSM/EDGE, is an evolution GSM. The name EDGE stands for Enhanced Data rates for GSM Evolution and it enables data to be sent over GSM at higher speeds. GSM EDGE systems may also be known as EGPRS, or Enhanced General Packet Radio Service systems.

In 3rd Generation Partnership Project (3GPP) Long Term Evolution (LTE), base stations, which may be referred to as eNodeBs, eNBs or even NBs, may be directly connected to other base stations and may be directly connected to one or more core networks.

The 3GPP LTE radio access standard has been written in order to support high bitrates and low latency both for uplink and downlink traffic. All data transmission is in LTE are controlled by the base stations.

UMTS is a third generation mobile communication system, which may be referred to as 3G, and which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Moreover, the 3GPP has undertaken to evolve further the UTRAN and GSM based radio access network technologies, for example into evolved UTRAN (E-UTRAN) used in LTE.

In the context of this disclosure, the expression Downlink (DL) may be used for the transmission path, or send direction, from a base station to a wireless device. The expression Uplink (UL) may be used for the transmission path, or send direction, in the opposite direction, i.e. from a wireless device to a base station.

Machine Type of Communication (MTC) has in recent years, especially in the context of the Internet of Things (IoT), shown to be a growing market segment for cellular technologies, especially for GSM/EDGE with its more or less global coverage, ubiquitous connectivity and price competitive devices. Realization of IoT benefit from utilizing cellular technologies and GSM technology is of great, perhaps of greatest, interest to utilize. In general it is desirable to be able to (re)use existing wireless communication systems and cellular technologies for new type of devices such as MTC devices. An MTC device is typically a wireless device that is a self and/or automatically controlled unattended machine and that is typically not associated with an active human user in order to generate data traffic. A MTC device is typically much more simple, and associated with a more specific application or purpose, than and in contrast to a conventional mobile phone or smart phone. MTC involve communication to and/or from MTC devices, which communication typically is of quite different nature and with other requirements than communication associated with e.g. conventional mobile phones and smart phones. In the context of and growth of the IoT it is evidently so that MTC traffic will be increasing and thus needs to be increasingly supported in wireless communication systems.

Problem related to (re)using existing technologies and systems is e.g. that the requirements for the new type of devices typically is different than conventional requirements, e.g. regarding the type and amount of traffic, performance etc. Existing systems have not been developed with these new requirements in mind. Also, traffic generated by new type of devices will typically be in addition to conventional traffic already supported by an existing system, which existing traffic typically needs to continue to be supported by and in the system, preferably without any substantial disturbance and/or deterioration of already supported services and performance.

Any modifications need of existing systems and technology should of course be cost efficient, such as enabled by low complexity modifications, and preferably allowing legacy devices already being employed to continue to be used and co-exist with the new type of devices in one and the same wireless communication system.

SUMMARY

It is an object to provide improvements with regard to handling of more and or new type of wireless devices in a wireless communication system.

According to a first aspect of embodiments herein, the object is achieved by a method performed by a radio network node comprised in a wireless communication system. The radio network node obtains downlink data, which downlink data is data for downlink transmission. The radio network node converts the obtained downlink data to a baseband signal. The conversion comprises Gaussian Minimum Shift Keying (GMSK) modulation of the downlink data. The modulation applies a negative modulation index selected based on a type of wireless device that is a target for the downlink data.

According to a second aspect of embodiments herein, the object is achieved by a computer program comprising instructions that when executed by a processing circuit cause the radio network node according to the first aspect to perform the method.

According to a third aspect of embodiments herein, the object is achieved by a data carrier comprising the computer program according to the second aspect.

According to a fourth aspect of embodiments herein, the object is achieved by a method, performed by a wireless device operative in a wireless communication system. The wireless device receives, from a radio network node comprised in the wireless communication system, a radio signal based on GMSK modulation of downlink data. The modulation applies a negative modulation index selected based on a type of the wireless device being target for the downlink data. The wireless device further provides user data based on the received radio signal.

According to a fifth aspect of embodiments herein, the object is achieved by a computer program comprising instructions that when executed by a processing circuit cause the wireless device according to the fourth aspect to perform the method.

According to a sixth aspect of embodiments herein, the object is achieved by a data carrier comprising the computer program according to the fifth aspect.

According to a seventh aspect of embodiments herein, the object is achieved by a radio network node configured to be operative in a wireless communication system. The radio network node is configured to obtain downlink data, which downlink data is data for downlink transmission. The radio network node is further configured to convert the obtained downlink data to a baseband signal. The conversion comprises GMSK modulation of the downlink data. The modulation applies a negative modulation index selected based on a type of wireless device that is a target for the downlink data.

According to an eight aspect of embodiments herein, the object is achieved by a wireless device configured to be operative in a wireless communication system. The wireless device is configured to receive, from a radio network node comprised in the wireless communication system, a radio signal based on GMSK modulation of downlink data. The modulation applies a negative modulation index selected based on a type of the wireless device being target for the downlink data. The wireless device is further configured to provide user data based on the received radio signal.

Thanks to embodiments herein and the GMSK with negative modulation index selected based on the type of the wireless device being the target for the downlink data, two types of wireless devices can co-exist with reduced risk that one type of wireless devices, e.g. a new type compared to a legacy type, negatively affect operation of wireless devices of the other type, such as operation of legacy wireless devices. For example, a first type, that may be legacy GSM devices, may be supported and co-exist together with a second type that may be a new type specifically for Machine Type of Communication (MTC). Selecting the negative modulation index based on the target for the downlink data, e.g. when the downlink data is targeted for a wireless device of the second type removes a risk that other type of wireless devices, not supporting modulation with negative modulation index, such as of a first type, e.g. legacy wireless devices, will interpret information wrong, and e.g. loose cell connection.

Additionally, embodiments herein can be implemented by comparatively simple modification of existing wireless communication system, e.g. prior art GSM.

Hence, embodiments herein facilitate modification of prior art wireless communication systems, in particular based on GSM, to support larger amounts of wireless devices and/or new type of wireless devices, such as MTC devices. In other words, embodiments herein provide improvements with regard to handling of more and/or new type of wireless devices in a wireless communication system.

BRIEF DESCRIPTION OF THE DRAWINGS

Examples of embodiments herein are described in more detail with reference to the appended schematic drawings, which are briefly described in the following.

DETAILED DESCRIPTION

Figure 1:
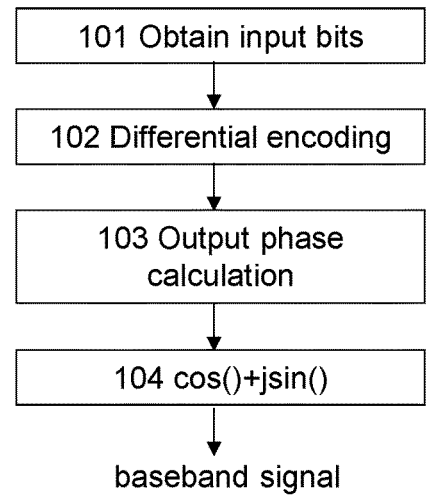
FIG. 1 is a block diagram schematically illustrating a prior art GMSK modulator used in GSM.

Throughout the following description similar reference numerals have been used to denote similar elements, units, modules, circuits, nodes, parts, items or features, when applicable.

As part of the development towards embodiments herein and for better understanding thereof, some aspects of prior art GSM systems will first be discussed.

GSM supporting General Packet Radio Service (GPRS), i.e. GSM/GPRS, employs Gaussian Minimum Phase Shift Keying (GMSK) to modulate the data, control and broadcast channels. The GMSK modulator is e.g. specified in Section 2 of 3GPP TS 45.004 v11.0.0 Modulation. GMSK and some of its properties are briefly reviewed in the following.

GSM/EDGE uses two different modulation techniques, namely GMSK and 8 Phase Shift Keying (8PSK). It can be noted that other modulations, such as QPSK, 16 Quadrature Amplitude Modulation (16QAM) and 32QAM, used for packet switched channels are defined in the 3GPP GSM EDGE Radio Access Network. (GERAN) specifications that also fall under GSM/EDGE, but these are not described in the following as the principles of these follow the same as described for 8PSK below.

Some characteristics of the GMSK and 8PSK modulations are reviewed in the following.

GMSK Transmitter

The GMSK modulator is specified in Section 2 of 3GPP TS 45.004 v11.0.0 Modulation. In particular, Section 2.5 describes the output phase of the modulated signal. One parameter is the modulation index h=1/2. A block diagram showing actions 101-104 relating to the GMSK modulator is shown in FIG. 1. Said actions are self-explanatory to the skilled person, in particularly in view of said specification.

GMSK Receiver

Figure 2:
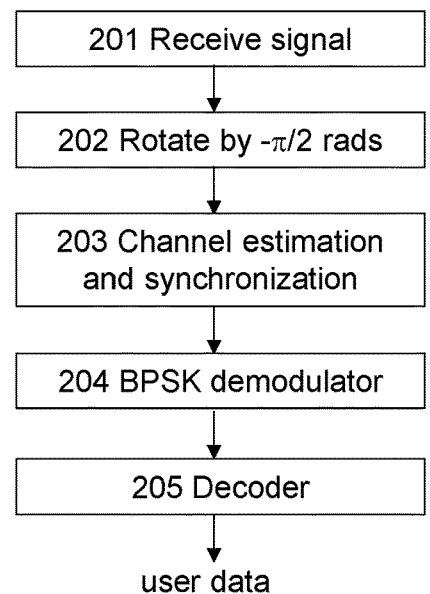
FIG. 2 is a block diagram schematically illustrating a prior art GMSK receiver used in GSM.

It is well known that the GMSK modulation used in GSM uses a so called bandwidth-time product factor, typically named BT, of BT=0.3, and therefore can be well approximated by linear modulation that uses a rotating BPSK constellation. The rotation is equal to $\pi/2$ radians. Note that no rotation is actually performed at the transmitter. However, the GSM receivers typically model the GMSK signal as a rotating BPSK linearly modulated signal. In other words, a $\pi/2$ radians rotation of the BPSK constellation is part of the model. Therefore, the first step in the receiver is to de-rotate the received samples by $\pi/2$ radians in order to obtain a time invariant signal constellation. A block diagram showing actions 201-205 of a traditional GMSK receiver used in GSM is shown in FIG. 2. Said actions are self-explanatory to the skilled person, in particularly in view of said specification.

8PSK Transmitter

Figure 3:
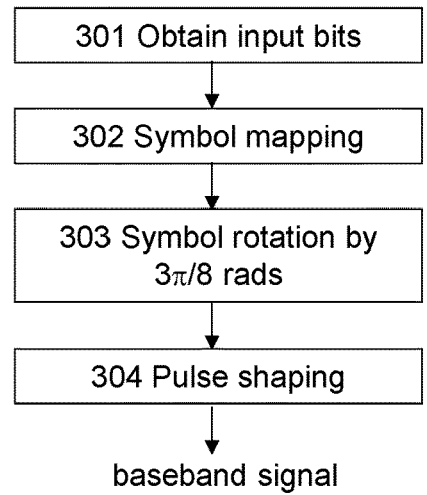
FIG. 3 is a block diagram schematically illustrating a prior art 8PSK modulator used in GSM.

The 8PSK modulator is specified in Section 3 of 3GPP TS 45.004 v11.0.0 Modulation. A linear modulation with a rotation 8PSK constellation is employed. The rotation angle is $3\pi/8$ radians. A block diagram showing actions 301-304 of the 8PSK modulator is shown in FIG. 3. Said actions are self-explanatory to the skilled person, in particularly in view of said specification.

8PSK Receiver

Figure 4:
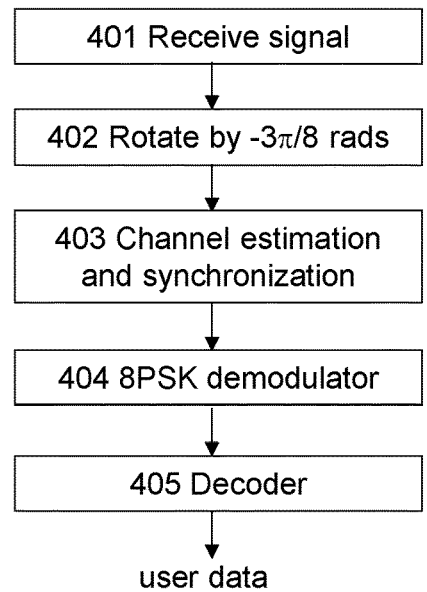
FIG. 4 is a block diagram schematically illustrating a prior art 8PSK receiver used in GSM.

In order to demodulate an 8PSK signal, the receiver must first de-rotate the signal by $3\pi/8$ radians. A block diagram showing actions 401-405 of a traditional 8PSK receiver used in GSM is shown in FIG. 4. Said actions are self-explanatory to the skilled person, in particularly in view of the prior art.

Figure 5:
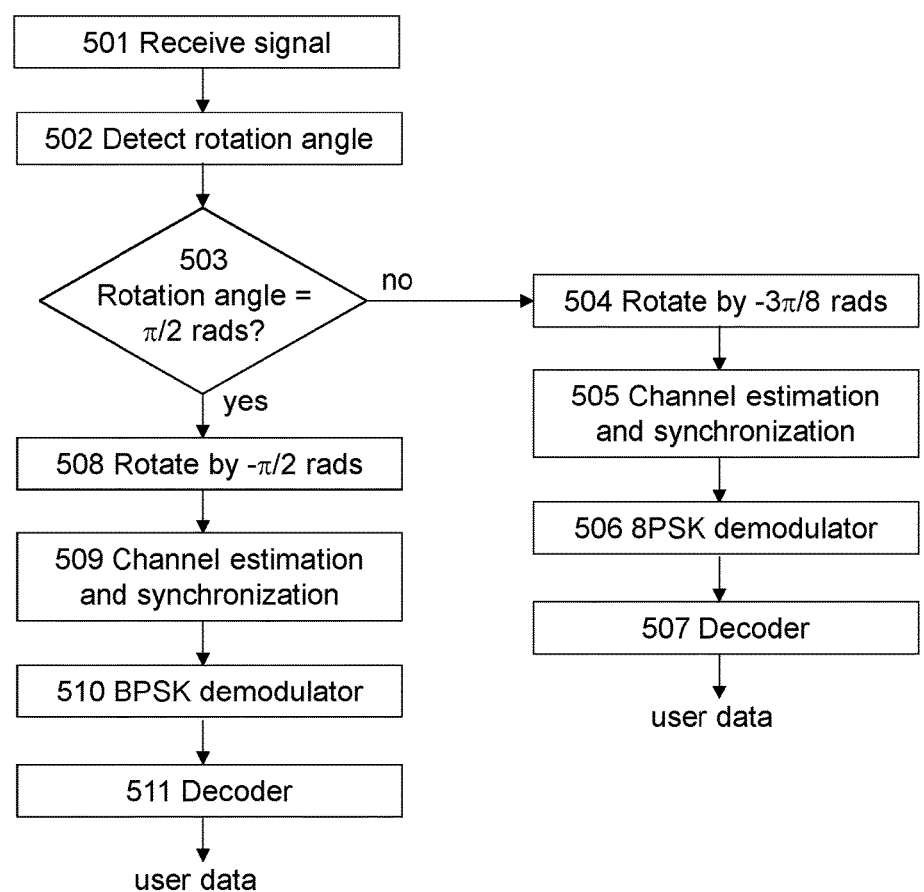
FIG. 5 is a block diagram schematically illustrating a prior art GMSK and 8PSK receiver used in GSM.

EGPRS receivers blindly detect the modulation type, i.e. GMSK or 8PSK, by detection the rotation angle in the received signal, i.e. $\pi/2$ or $3\pi/8$ radians. A block diagram showing actions 501-511 of a traditional GMSK receiver used in GSM is shown in FIG. 5. Said actions are self-explanatory to the skilled person, in particularly in view of the prior art.

The GSM system has since the early days evolved to include more features and services than was predicted in the initial phase of specification and deployment.

One important factor when evolving an existing system is to ensure that what is usually referred to as 'legacy devices', i.e. devices already existing in the network, are not affected by the new functionality being added. In GSM wireless devices are typically named Mobile Stations (MSs). Hence, legacy MS refer to a MS of a type already existing and supported in prior art GSM.

One example of such an evolution was the addition of a new packet switched carrier type, Enhanced GPRS phase 2 (EGPRS2), in addition to GPRS and EDGE, in 3GPP GERAN Release 7. In EGPRS2 the modulation types used are partly overlapping with EGPRS, with both carrier types using 8PSK modulation but defining different Modulation and Coding Schemes (MCSs) depending on the carrier type used. In this scenario there is always a risk that the legacy MS erroneously detects the new MCS as being intended for the legacy MS. This type of problem is referred to as a false detection.

There are different ways to solve the false detection problem, such as defining a new training sequence/sync sequence that is not readable by the legacy MS, using another modulation scheme that is not supported by the legacy mobile etc.

One example from GSM where the false detection became a problem was in the initial phase of GSM when MSs connected to the network. Monitoring a DL would erroneously interpret blocks received as valid speech frames, resulting in noise being played back in the speaker at the end-user. The solution in the specifications was to introduce a dummy burst where the full burst sequence was defined. Especially a new training sequence was deployed ensuring legacy mobiles not being able to demodulate the DL block.

Embodiments herein enable introduction of a physical layer that is to a very large extent compatible with the GSM/EDGE physical layer, as well as with legacy GSM/EDGE hardware, but that at the same time is incompatible with legacy GSM/EDGE devices. To this end, GMSK modulation with a negative modulation index is introduced and used in embodiments herein for wireless devices based on their type, e.g. for wireless devices of a new type compared to another, typically conventional or legacy type, such as of legacy wireless devices. This enable preservation of important characteristics of the modulated signals, thereby facilitating implementation in and modification of e.g. prior art GSM, while at the same time legacy GSM/EDGE receivers do not receive or transmit such signals and thus are not affected.

A main idea underlying embodiments herein is based on re-use of an existing system's physical layer, e.g. the GSM/EDGE physical layer, such as burst formats, sampling times, frame and multi-frame definitions, e.g. as defined in 3GPP TS 45.001 v11.0.0 "Physical layer on the radio path", 3GPP TS 45.002 v11.0.0 "Multiplexing and multiple access on the radio path", 3GPP TS 45.003 v11.0.0 "Channel coding" and 3GPP TS 45.004 v11.0.0 "Modulation", as a basis for the physical layer in e.g. cellular IoT applications, but to introduce modification to the modulation conventionally used in the transmitter. For GMSK, it is herein proposed to use a negative modulation index $h=-1/2$. This allows the re-use of legacy transmitter (TX) and receiver (RX) hardware, requiring only minor modifications to the software. At the same time, these small changes render the signals impossible to decode for legacy GSM/EDGE receivers.

Embodiments herein are further discussed and exemplified in the following.

Figure 6:
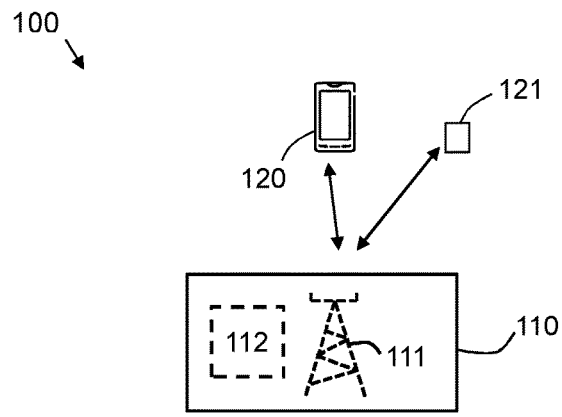
FIG. 6 is a block diagram schematically depicting an example of a wireless communication system relevant for embodiments herein.

FIG. 6 is a schematic block diagram schematically depicting an example of a wireless communication system 100 relevant for embodiments herein. The wireless communication network 100 is typically a telecommunication system, such as a cellular communication network that e.g. may be based on GSM.

A radio network node 110 is shown comprised in the wireless communication system 100. The radio network node 110 may be or be comprised in a Base Station Subsystem (BSS), e.g. such supporting GSM/EDGE, or more particularly the radio network node 110 may be a base station 111, e.g. a Base Transceiver Station (BTS) of said BSS. In some embodiments the radio network node 110 may correspond to a controlling node 112 of a base station, which may control one or more base stations, including e.g. the base station 111.

The radio network node 110 may serve and/or control and/or manage one or more wireless devices, e.g. MSs, such as wireless devices 120, 121 shown in the figure, which are supported by and/or operative in the wireless communication system 100.

The wireless device 120 is an example of a first type of wireless devices that are enabled to communicate in the wireless communication system 100. The first type of wireless devices may comprise conventional, such as prior art, cellular, mobile, phones, e.g. smart phones. The enabled communication is via the base station 110, in the uplink and downlink, and according to a first RAT, e.g. GSM.

The wireless device 121 is an example of a second type of wireless devices that are enabled to communicate in the wireless communication system 100. The second type of wireless devices may be a device specifically for MTC.

Attention is drawn to that FIG. 6 is only schematic and for exemplifying purpose and that not everything shown in the figure is required for all embodiments herein, as will be evident to the skilled person based on what is disclosed herein. Also, a wireless communication system that in reality corresponds to the wireless communication system 100 typically comprises several further network nodes, base stations, cells etc., as realized by the skilled person, but which are not shown herein for the sake of simplifying.

Figure 7:
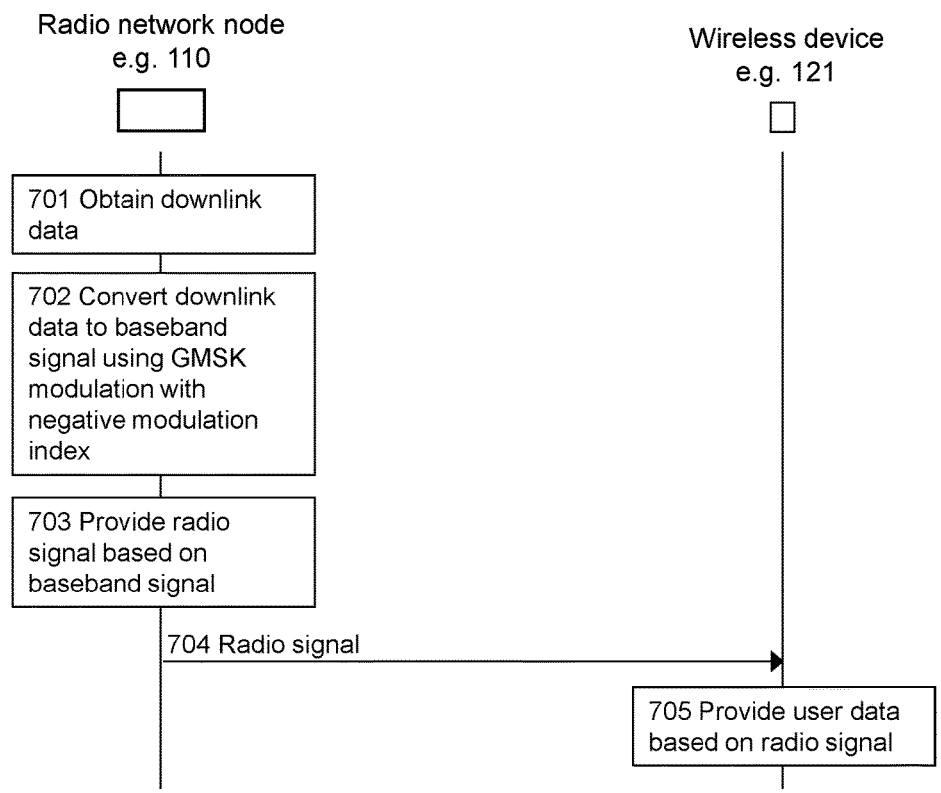
FIG. 7 is a combined signaling diagram and flowchart for describing embodiments herein.

FIG. 7 depicts a combined signaling diagram and flowchart and will be used to introduce and discuss embodiments herein and related examples. Methods, performed by a radio network node, e.g. the radio network node 110, and a wireless device, e.g. the wireless device 121, are provided.

The methods comprise the following actions, which actions may be taken in any suitable order and/or be carried out fully or partly overlapping in time when this is possible and suitable.

Action 701

The radio network node 110 obtains downlink data. Downlink data refers to data for transmission in the downlink, i.e. to be sent in the downlink. For example, to be sent in the downlink to the wireless device 121 of said second type, such as a wireless device specifically for MTC and e.g. used in realization of IoT.

Action 702

The radio network node 110 converts the obtained downlink data to a baseband signal. The conversion comprises GMSK modulation of the downlink data, and the modulation applies a negative modulation index, preferably −1/2. The negative modulation index is preferably selected based on a type of wireless device that is a target for the downlink data, such as selected based on which type of wireless device is being the target for the downlink data. For example, when the downlink data targets the wireless device 121, the selection of the negative modulation index is based on that the wireless device 121 is of said second type.

In some embodiments, the modulation index, or modulation indices, is selected based on the destination associated with or a target for the downlink data, e.g. which type of wireless device is being the target for the downlink data. For example, the modulation index of 1/2 may be selected when the target of the downlink data is a wireless device of a first type, such as the wireless device 120 and/or a legacy wireless device, e.g. a conventional mobile phone, and the modulation index of −1/2 may be selected when the target of the downlink data is a wireless device of a second type, such as the wireless device 121 and/or a MTC device or another kind of device that may be considered "new" in relation to legacy devices. The second type may thus be wireless devices that are not conventionally supported by the wireless communication system and/or the first type may be wireless devices supported before the second type became supported by the wireless communication system.

Figure 8:
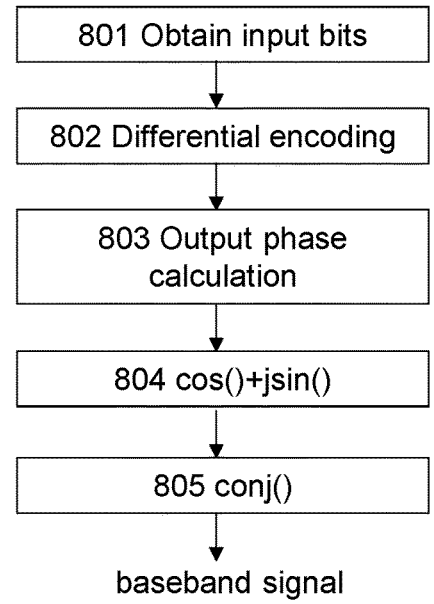
FIG. 8 is a block diagram schematically illustrating a first method according to some embodiments for modifying existing GMSK modulators to accomplish negative modulation index.

In some embodiments the GMSK modulation applying the modulation index of −1/2 is accomplished based on complex conjugation of a GMSK modulated signal with a positive modulation index, such as complex conjugation of GMSK baseband signal applying a modulation index of 1/2, which may be a legacy GMSK baseband signal, e.g. as conventionally used in GSM. This is further exemplified separately below. See e.g. FIG. 8 and related text below.

Figure 9:
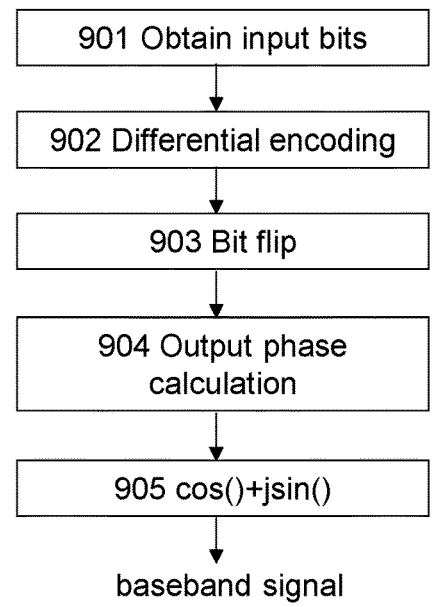
FIG. 9 is a block diagram schematically illustrating a second method according to some embodiments for modifying existing GMSK modulators to accomplish negative modulation index.

In some embodiments the downlink data is input bits and the GMSK modulation applying the modulation index of −1/2 is accomplished based on polarity change of bits of the downlink data, e.g. the downlink data is an input bit sequence and each 0 thereof is changed to 1 and each 0 thereof is changed to 1. This is further exemplified separately below. See e.g. FIG. 9 and related text below.

In the modulation, alternating modulation indices may be used, e.g. alternating between −1/2 and 1/2.

Figure 12:
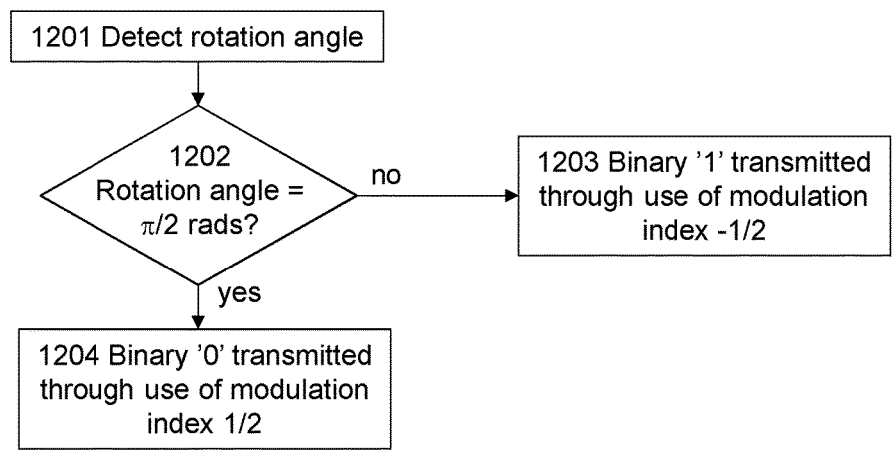
FIG. 12 is a block diagram schematically illustrating a principle according to some embodiments where rotation angle or modification of modulation index for GMSK encodes information.

In some embodiments, the modulation index is alternated in order to encode information, e.g. so that the alternation encodes information of the downlink data. For example, modulation index −1/2 may be used to encode binary 0 and modulation index 1/2 be used to encode binary 1, or vice versa. Hence, one or more bits of information may be encoded by alternating the modulation index. This is further exemplified separately below. See e.g. FIG. 12 and related text. E.g. a pattern of alternation of the modulation index may encode information that may be part of or in addition to the downlink data.

Figure 13:
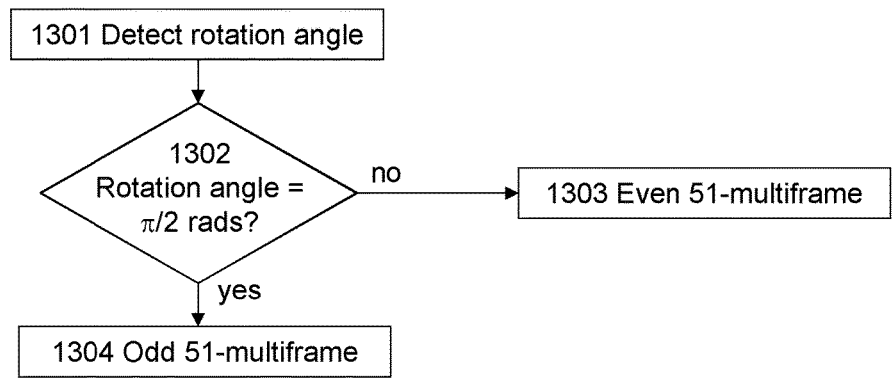
FIG. 13 is a block diagram schematically illustrating a principle according to some embodiments where 51-multi-frames and modulation index are alternated.

In some embodiments, the modulation index is alternated between periods of transmission intervals, e.g. Time Division Multiple Access (TDMA) frames, which periods may be predetermined. For example in GSM EDGE, during even periods of 51 TDMA frames, a so called 51-multiframe, the modulation index of 1/2 may be used, and during odd such periods the modulation index of −1/2 may be used, or vice versa. This is further exemplified separately below. See e.g. FIG. 13 and related text.

In some embodiments, the modulation index or indices are associated with a respective identifier space. An identifier space may correspond to an identifier range resulting from a number of bits used by an identifier field. Examples of identifiers are in the case of GSM EDGE Uplink State Flag (USF) identifiers and Temporary Flow Identifiers (TFIs). For example, the modulation index 1/2 may be associated with a first identifier space of e.g. USF identifiers and the modulation index −1/2 may be associated with a second identifier space of e.g. USF identifiers. This enables extension of the total identifier space, in the example a two times extension. For example, said first type of wireless devices may respond only to modulation index 1/2 and using the first identifier space, and the second type of wireless devices mat respond only to the modulation index −1/2 and using the second identifier space. Hence, for example the same USF value may be used at the same time by different wireless devices. If said second type of wireless devices respond to modulation index 1/2 in addition to modulation index −1/2, the extension of identifier space is still achieved while at the same time full segregation between the said first and second type of devices can be avoided. For example, a data channel, e.g. the Packet Data CHannel (PDCH) in GSM, may be transmitted to a first type of wireless device using −1/2 modulation index and include a USF addressed to a second type of wireless device capable of both 1/2 and −1/2 modulation indices. If the second type of wireless device would only be capable of −1/2 modulation index this would not be possible and there would be full, 100% segregation which is not always desirable.

Associating modulation index or indices with identifier spaces is further exemplified separately below.

Action 703

The radio network node 110 provides a radio signal based on the baseband signal.

Action 704

The radio network node 110 sends the radio signal to a wireless device, e.g. the wireless device 120 and/or 121, which receives it.

Hence, following how the radio signal was accomplish according to the above, the received radio signal is based on GMSK modulation of the downlink data, which modulation applies a negative modulation index, preferably −1/2.

Action 705

The wireless device 121 provides downlink data based on the received radio signal. The provided downlink data may then be further processed by the wireless device and/or eventually be used in or by the wireless device, e.g. be presented in a suitable form to a user of the wireless device or to control the wireless device.

The provision of the downlink data typically comprises that the wireless device 121 provides a baseband signal based on the received radio signal and demod-ulates the baseband signal based on a rotation angle of the baseband signal. For example, the rotation angle may be −π/2 radians, which corresponds to the modulation index −1/2. This is further exemplified separately below. See e.g. FIG. 10 and related text.

The wireless device 121 may then provide the downlink data, or part of it, such as user data comprised in the downlink data, based on the demodulated baseband signal.

Figure 11:
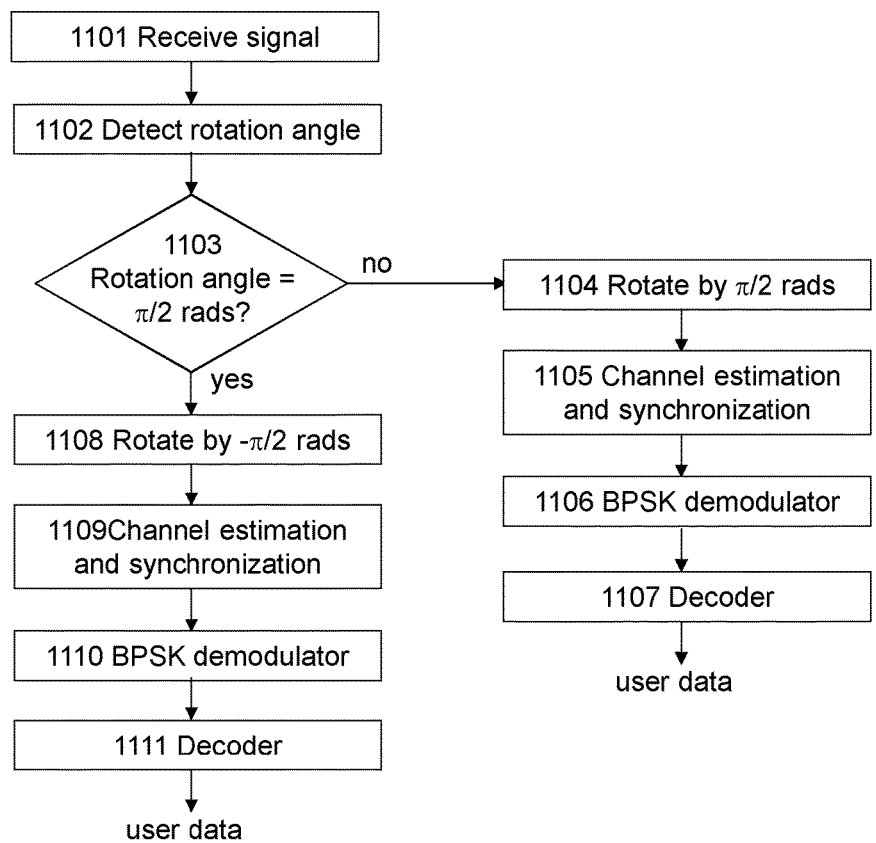
FIG. 11 is a block diagram schematically illustrating how blind detection of modulation as in GSM/EDGE can be modified to implement some embodiments herein.

Note that the rotation angle may be predetermined and/or pre-defined, or be detected from a set of predetermined and/or pre-defined rotation angles. As mentioned above, alternating modulation indices may be used in the modulation, e.g. alternating between −1/2 and 1/2. The detection may comprise detecting the modulation indices that are alternated. This is further exemplified separately below. See e.g. FIG. 11 and related text.

As also realized from and discussed in relation to the above actions, in some embodiments, the modulation index is alternated between periods of transmission intervals, e.g. TDMA frames, which periods may be predetermined. For example in GSM EDGE, during even periods of 51 TDMA frames, a so called 51-multiframe, the modulation index of 1/2 may be used, and during odd such periods the modulation index of −1/2 may be used, or vice versa. The wireless device may use the detection of the modulation indices that are alternated to determine whether a transmitted radio block, is in an odd or even period, e.g. a 51-multiframe. This may then be used by a receiving wireless device, e.g. the wireless device 120 or 121, to e.g. determine a Reduced TDMA frame number (RFN), see e.g. 3GPP TS 45.002 v11.0.0 "Multiplexing and multiple access on the radio path". As already mentioned in connection with the above actions, embodiments for handling 51-multiframes are further discussed separately below. See e.g. FIG. 13 and related text.

As further realized from and discussed in relation to the above actions, in some embodiments, the modulation index is alternated in order to encode information, e.g. so that the alternation encodes information of the downlink data. For example, modulation index −1/2 may be used to encode binary 0 and modulation index 1/2 be used to encode binary 1, or vice versa. Hence, one or more bits of information may be encoded by the alternated modulation index. The wireless device may use the detection of the modulation indices to decode this information. As already mentioned in connection with the above actions, embodiments for encoding information bits using the modulation index are further discussed separately below. See e.g. FIG. 12 and related text.

Thanks to embodiments herein and the GMSK with negative modulation index selected based on the type of the wireless device being the target for the downlink data, two types of wireless devices can co-exist with reduced risk that one type of wireless devices, e.g. a new type compared to a legacy type, negatively affect operation of wireless devices of the other type, such as of legacy wireless devices. For example, a first type that may be legacy GSM devices, such as the type of the wireless device 120, may be supported and co-exist together with a second type that may be a new type specifically for MTC, such as the type of the wireless device 121. Selecting the negative modulation index based on the target for the downlink data, e.g. when the downlink data is a wireless device, such as the wireless device 121, of the second type, removes a risk that other type of wireless devices not supporting modulation with negative modulation index, such as of a first type, e.g. the wireless device 120 or legacy wireless devices in general, will interpret information wrong, thus be interfered by the second type, and e.g. loose cell connection.

Additionally, embodiments herein can be implemented by comparatively simple modification of existing wireless communication system, e.g. prior art GSM.

Hence, embodiments herein facilitate modification of prior art wireless communication systems, in particular based on GSM, to support larger amounts of wireless devices and/or new type of wireless devices, such as MTC devices. In other words, embodiments herein provide improvements with regard to handling of more and/or new type of wireless devices, in a wireless communication system.

More particularly embodiments herein e.g. enable to use a GSM or GSM-like system with physical layer defined as in prior art GSM, but where the GMSK modulator is modified by using a negative modulation index $h=-1/2$ instead of $h=1/2$. Moreover, low complexity modifications of existing GSM TX and RX hardware are enabled. Embodiments herein may be implemented in existing hardware by means of software (SW) upgrade. Hence, GSM/EDGE physical layer design, as well as GSM/EDGE compatible HW, may be re-used to e.g. build cellular IoT infrastructure. At the same time, legacy GSM/EDGE modems will be unable to decode the cellular IoT signals, e.g. signals intended only for MTC devices.

Advantages, including further advantages, associated with embodiments herein may also be described according to the following:

Low-complex modification to existing modulator and receiver implementations of prior art GSM is enabled, while at the same time legacy wireless devices are protected from misinterpreting new functionality for new type of wireless devices being introduced in the system.

A new type of wireless device capable of handling negative modulation index is able be introduced and "multiplexed" within an existing, or besides, a legacy GSM system.

Reuse of existing addressing identifiers in the GSM packet switched domain is enabled and supported.

A robust low-rate but increased information rate for devices supporting modulation with the negative modulation is enabled and supported.

Embodiments will now be exemplified in further detail, in particular when the wireless communication system 100 is GSM and with focus on how prior art can be modified to implement embodiments herein.

An existing modulator used in prior art GSM may be configured to apply GMSK Modulation with negative modulation index, preferably $h=-1/2$ which will be used as example in the following. The variant of GMSK modulation in accordance with embodiments herein may be defined as in Section 2 of 3GPP TS 45.004 v11.0.0 "Modulation", except that in Section 2.5 the modulation index $h=-1/2$ is used instead. It is not difficult to design a GMSK modulator with a negative modulation index. However, in order to save costs and development time, it might be useful to re-use the implemented GMSK modulators. Two simple methods to modify existing GMSK modulators are therefore proposed in the following and correspond to what have been mentioned above.

Modification of Existing GMSK Modulator, Method 1:

A GMSK baseband signal $x(t)$ may be expressed in the form $x(t)=\exp(j\varphi(t))$, where $\varphi(t)$ is the output phase defined in Section 2.5 of 3GPP TS 45.004 v11.0.0 "Modulation". A GMSK baseband signal $y(t)$ with a negative modulation index may be obtained from a legacy GMSK baseband signal $x(t)$ by applying complex conjugation: $y(t)=\text{conj}(x(t))$.

Complex conjugation is very easy to apply to a digital baseband signal. The block diagram in FIG. 8 and actions 801-805 illustrates the procedure. Action 805 relates to the complex conjugation and the other actions to prior art actions, compare e.g. with FIG. 1.

Modification of Existing GMSK Modulator, Method 2:

A second solution comprises inserting "bit flip" after the differential encoder and before the calculation of the output phase. The bit flip changes the polarity of all the input bits. That is each 0 in the input bit sequence is changed to a 1, and each 1 is changed to a 0. The block diagram in FIG. 9 and actions 901-905 illustrates the procedure. Action 903 relates to the bit flip and the other actions to prior art actions, compare e.g. with FIG. 1.

Figure 10:
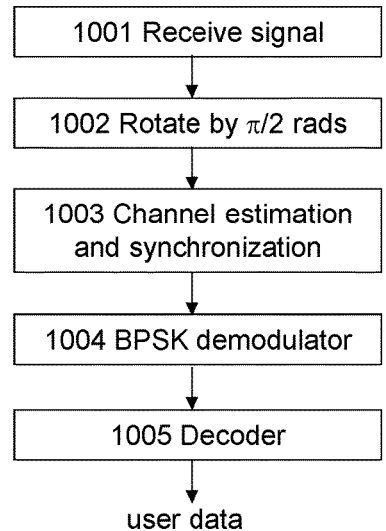
FIG. 10 is a block diagram schematically illustrating how blind detection can be used to implement some embodiments herein.

Further, legacy GMSK receiver algorithms, i.e. as used in prior art GSM, may be employed provided that a rotation of $\pi/2$ radians is applied instead. FIG. 10 and actions 1001-1005 illustrates the procedure. Note the difference between action 1002 and action 402 of FIG. 2.

Blind detection of modulation may be performed similar as in GSM/EDGE discussed above, but to implement embodiments herein the receiver may instead detect whether the rotation angle is $-\pi/2$ radians or $\pi/2$ radians. The schematic block diagram in FIG. 11 and actions 1101-1111 illustrates this. The receiver may thus blindly detect whether the modulation used is GMSK or a variant according to embodiments herein, i.e. GMSK with negative modulation index, such as $h=-1/2$. Compare FIG. 11 and actions thereof with e.g. the actions shown FIGS. 2, 5 and 10.

In a general application of embodiments herein, legacy devices, e.g. the wireless device 120, present in the wireless communication system 100 will not be aware of the modulation with negative modulation index as in embodiments herein and are thus incompatible with a new mode of transmitting information according to embodiments herein. This may effectively create two pools of resources on what may be common or dedicated physical channels in the wireless communication system 100. Regarding downlink data on common channels this may e.g. be used to avoid the risk of legacy wireless devices, e.g. the wireless device 120, misinterpreting information being transmitted to new type of devices, e.g. the wireless device 121. Regarding downlink data on dedicated channels this may e.g. be used as a mean to support reuse of existing resources such as identifiers for addressing wireless devices in a packet switched domain.

Alternatively a new receiver, such as the wireless device 121, may be made aware of both legacy and new transmission modes used by the transmitter, such as the radio network node 110, and effectively support operation both per legacy GSM and according to embodiments herein. This alternative may generally be applied to secure co-existence of two systems in "parallel" over the same radio resources.

In a system supporting both legacy and transmission modes associated with embodiments herein, the transmission modes may be utilized as a level of additional information, enabling additional information to be transmitted in the downlink. The rotation angle or the modification of the modulation index for GMSK may be seen as one additional information bit transmitted to and detectable by the receiver. The schematic block diagram in FIG. 12 and self-explanatory actions 1201-1204 illustrates the principle.

The detection may be based on what was discussed above in relation to FIG. 11, i.e. where the receiver blindly may detect whether the modulation used is GMSK or a variant according to embodiments herein, i.e. GMSK with negative modulation index, such as h=−1/2. This allows the transmitter to signal one extra bit in each burst, e.g. mapping 0 to the positive modulation index and 1 to the positive modulation index, or vice versa.

In the following sections, some examples of how embodiments herein may be used in the GSM/EDGE system are outlined. It should be noted that although some concrete examples will be given how embodiments herein may be applied to existing, prior art, wireless communication systems, mainly GSM, this does not exclude wider application to also other prior art and/or future wireless communication systems.

There have been discussions regarding how to support ultra-low-cost devices with extreme coverage requirements in GSM/EDGE networks. See e.g. GP-140421, "New Study Item on Cellular System Support for Ultra Low Complexity and Low Throughput Internet of Things (FS_IoT_LC) (revision of GP-140418)", source VODAFONE Group Plc. This discussion implies that the timing and frequency synchronization channels, Frequency Correction CHannel (FCCH) and Synchronization Channel (SCH), may need to be re-designed to provide extended coverage. Re-designed in this regard may simply mean a new mapping of these logical channels to the existing channel organization, and not a complete re-design of the channel itself. At the same time, a requirement associated with new type of wireless devices, such as wireless devices specific for MTC communication, is "ultra-low-cost" and hence all savings in implementation cost and maximization of re-using existing implementations are of great interest. Through embodiments herein it may be ensured that even when re-using the existing FCCH and SCH channel definitions also for new type of devices, such as for the wireless device 121, where a new channel mapping of the FCCH and SCH may be needed.

However, legacy wireless devices, such as the wireless device 120, must not be able to erroneously interpret the channels as being valid. If such a false detection occurs, a legacy wireless device may lose connection to a cell by misinterpreting a frequency reference associated with FCCH, and/or by misinterpreting a frame structure and frame numbering associated with SCH.

In prior art GSM the SCH contains a Reduced TDMA frame Number (RFN) that serves as a reference to devices in the system. The SCH is transmitted, using a single burst format, five times during each period of 51 TDMA frames, also called a 51-multiframe. Each instance of SCH contains a unique RFN, meaning that the content of each SCH transmission is different from the previous transmission.

In a wireless communication system where devices require extended coverage, and the system achieves this coverage through repetition based transmission schemes, it is of importance that the devices are able to coherently combine the received repetitions. For the SCH this implies that the RFN information may no longer be changed between consecutive burst transmissions but need to instead contain the same information between bursts during a specific repetition interval. This will allow the receiver to coherently combine the different repetitions and ultimately decode the SCH information.

This however poses a problem. How does a receiver know the TDMA frame reference if identical RFN information is provided in multiple consecutive SCH blocks, when assuming a repetition interval exceeding the TDMA frame duration?

To alleviate this problem, in some embodiments, the SCHs are transmitted in alternating 51-multiframes by alternating the modulation index for the GMSK modulation. For example, in even 51-multiframes the legacy GMSK modulator may be used, while for odd 51-multiframes the alternative negative modulation index may be used. The schematic block diagram in FIG. 13 and self-explanatory actions 1301-1304 illustrates the principle. This will effectively create an additional bit of information indicating if the 51-multiframe is even or odd in the overall frame structure, and hence will support the receiver to determine the exact value of the reduced TDMA frame number.

This would not only allow for an improved determination of the reduced TDMA frame number for users in extended coverage but will also allow for devices requiring coherent reception of SCHs only within a 51-multiframe, i.e. a device need not read the SCH over the full repetition interval to decode the block, to quickly determine if the 51-multiframe where the SCH was decoded is an even or odd 51-multiframe in the overall TDMA frame structure.

In the GSM packet switched domain, addressing devices in the uplink and downlink are dependent on USF and TFI identifiers. The USF is a 3 bit identifier field signaled in the downlink to support scheduling of an uplink radio resource to one of 8 users multiplexed on that UL resource. The TFI is a 5 bit identifier field supporting addressing of temporary block flows (TBF) to maximum 32 users in the uplink or downlink.

Extending the support of legacy GSM operation to also new type of wireless devices, as discussed above, may cause a depletion of the mentioned identifier spaces. Embodiments herein allow to fully reuse an existing TFI identifiers space. A TFI sent over a downlink radio block using legacy GSM modulation may be addressed to a legacy device, or to a new type of device supporting GSM. The very same TFI may however be reused in a radio block using modulation with negative modulation index as proposed herein in case of e.g. a new type of device implementing embodiments herein since the legacy device assigned the very same TFI will not be able to decode the radio block.

Additionally, modulation with negative modulation index according to embodiments herein may also be used to fully reuse an existing USF identifiers space. The same approach as outlined in the foregoing paragraph for the reuse of the TFI may be applied also to reuse of USF values between e.g. legacy devices and new type of devices implementing embodiments herein, i.e. that are capable of handling GMSK modulation with negative modulation index.

Figure 14:
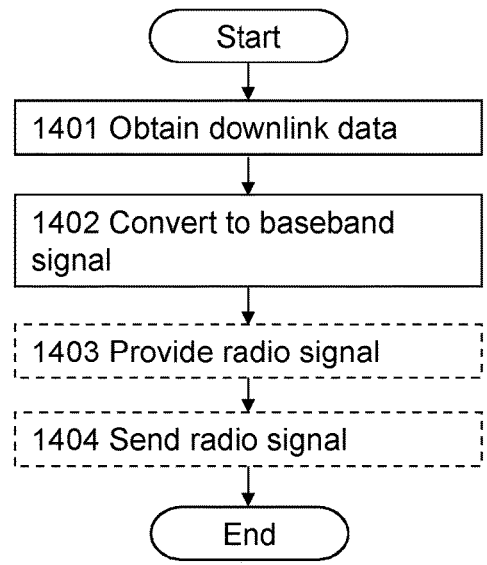
FIG. 14 is a flowchart schematically illustrating embodiments of a method performed in a radio network node.

FIG. 14 is a flow chart schematically illustrating embodiments of a method, performed by a radio network node, e.g. the radio network node 110, comprised in a wireless communication system, e.g. the wireless communication system 100. The wireless communication system 100 may be GSM or based on GSM.

The method comprises the following actions, which actions may be taken in any suitable order and/or be carried out fully or partly overlapping in time when this is possible and suitable.

Action 1401

The radio network node 110 obtains downlink data, which downlink data is data for downlink transmission.

This action may fully or partly correspond to Actions 701, 801 and 901 above.

Action 1402

The radio network node 110 converts the obtained downlink data to a baseband signal. The conversion comprises GMSK modulation of the downlink data, wherein the modulation applies a negative modulation index, preferably −1/2, selected based on a type of wireless device, e.g. of the wireless device 121, that is a target for the downlink data. The negative modulation index may be selected specifically for wireless devices of said type.

In some embodiments, the GMSK modulation applying the negative modulation index is accomplished based on complex conjugation of a GMSK modulated signal with a positive modulation index.

In some embodiments, the GMSK modulation applying the negative modulation index is accomplished based on polarity change of bits of the downlink data. As realized by the skilled person, at least in case of GSM the polarity change is made after differential encoding.

Further, in some embodiments, the negative modulation index is alternated with another modulation index so that alternating modulation indices are used in the modulation.

The alternating modulation indices may be alternated between predetermined periods of transmission intervals. The predetermined periods may be periods of multiframes, each multiframe being 51 TDMA frames. As described above, this enables a wireless device that is target of the downlink data, e.g. the wireless device 121, to detect odd and even such multiframes, so called 51-multiframes, by detecting which modulation index has been used. As recognized by the skilled person, which modulation index that has been used may be found out by detecting rotation angle.

The alternating modulation indices may be alternated so that the alternation encodes information.

The alternating modulation indices may be associated with a respective identifier space.

This action may fully or partly correspond to Actions 702, 802-805 and 902-905 above.

Action 1403

The radio network node 110 may provide a radio signal based on the baseband signal.

This action may fully or partly correspond to Action 703 above.

Action 1404

The radio network node 110 may send the radio signal to one or more wireless devices, e.g. one or more of the wireless devices 120-121.

This action may fully or partly correspond to Action 704 above.

Figure 15:
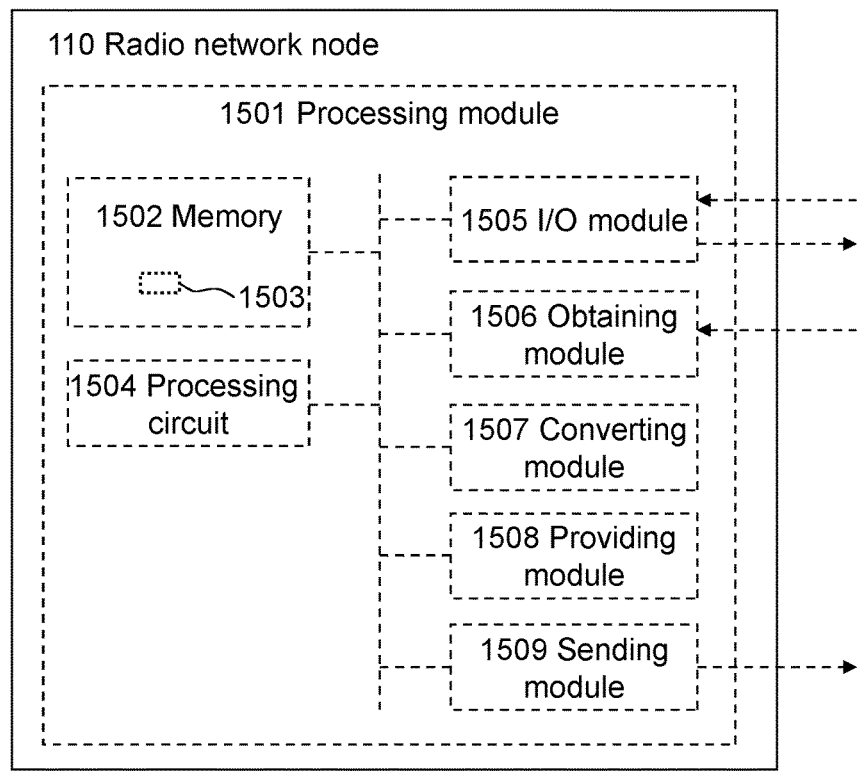
FIG. 15 is a functional block diagram for illustrating embodiments of the radio network node.

FIG. 15 is a schematic block diagram for illustrating embodiments of the radio network node 110, in particular how it may be configured to perform the method and/or one or more actions thereof as described herein, in particular the method and actions discussed above in relation to FIG. 14.

Hence, the radio network node 110 may comprise:

A processing module 1501, such as a means, one or more hardware modules, including e.g. one or more processors, and/or one or more software modules for performing said methods and/or actions.

A memory 1502 that may comprise, such as contain or store, a computer program 1503. The computer program comprises 'instructions' or 'code' directly or indirectly executable by the radio network node 110 so that it performs the said methods and/or actions. The memory 1502 may comprise one or more memory units and may be further be arranged to store data, such as configurations and/or applications involved in or for performing functions and actions of embodiments herein.

A processing circuit 1504 as an exemplifying hardware module and may comprise or correspond to one or more processors. In some embodiments, the processing module 1501 may comprise, e.g. 'is embodied in the form of' or 'realized by' the processing circuit 1504. In these embodiments, the memory 1502 may comprise the computer program 1503 executable by the processing circuit 1504, whereby the radio network node 110 is operative, or configured, to perform said method and/or actions.

An Input/Output (I/O) module 1505, configured to be involved in, e.g. by performing, any communication to and/or from other units and/or nodes, such as sending and/or receiving information to and/or from other external nodes or devices. The I/O module 1505 may be exemplified by an obtaining, e.g. receiving, module and/or a sending module, when applicable.

The radio network node 110 may also comprise other exemplifying hardware and/or software module(s), such as one or more of an obtaining module 1506, a converting module 1507, a providing module 1508 and a sending module 1509, which module(s) may be fully or partly implemented by the processing circuit 1504.

Hence, the radio network node 110 and/or the processing module 1501 and/or the obtaining module 1506 and/or the I/O module 1505 may be operative, or configured, to obtain said downlink data.

Moreover, the radio network node 110 and/or the processing module 1501 and/or the converting module 1507 may be operative, or configured, to convert the obtained downlink data to said baseband signal, which conversion thus comprises GMSK modulation of the downlink data, which modulation applies a negative modulation index selected based on a type of wireless device, such as of the wireless device 121, that is the target for the downlink data.

Also, the radio network node 110 and/or the processing module 1501 and/or the providing module 1508 may be operative, or configured, to provide said radio signal based on the baseband signal.

Furthermore, the radio network node 110 and/or the processing module 1501 and/or the sending module 1509 and/or the I/O module 1505 may be operative, or configured, to send the radio signal to one or more wireless devices, e.g. the wireless device 121 and/or the wireless device 120.

Figure 16:
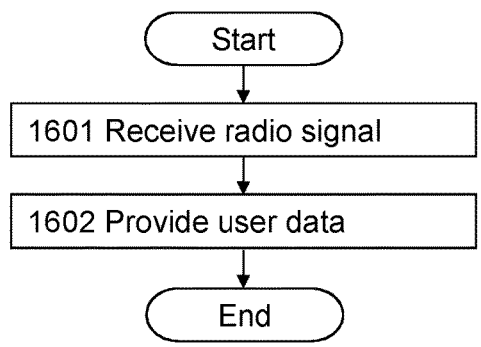
FIG. 16 is a flowchart schematically illustrating embodiments of a method performed in a wireless device.

FIG. 16 is a flow chart schematically illustrating embodiments of a method, performed by a wireless device, e.g. the wireless device 121, operative in a wireless communication system, e.g. the wireless communication system 100. The wireless communication system 100 may be GSM or based on GSM.

The method comprises the following actions, which actions may be taken in any suitable order and/or be carried out fully or partly overlapping in time when this is possible and suitable.

Action 1601

The wireless device 121 receives, from a radio network node, e.g. the radio network node 110, comprised in the wireless communication system 100, a radio signal. The radio signal being based on GMSK modulation of downlink data. The modulation applies a negative modulation index, preferably −1/2, selected based on a type of the wireless device 121 being target for the downlink data. The negative modulation index may be selected specifically for wireless devices of said type.

In some embodiments, the negative modulation index is alternated with another modulation index so that alternating modulation indices are used in the modulation.

The alternating modulation indices may be alternated between predetermined periods of transmission intervals. The predetermined periods may be periods of multiframes, each multiframe being 51 TDMA frames.

The alternating modulation indices may be alternated so that the alternation encodes information.

The alternating modulation indices may be associated with a respective identifier space.

This action may fully or partly correspond to Actions 704, 1001 and 1101 above.

Action 1602

The wireless device 121 provides user data based on the received radio signal.

This action may fully or partly correspond to Actions 705, 1002-1005 and 1102-1107 above.

Figure 17:
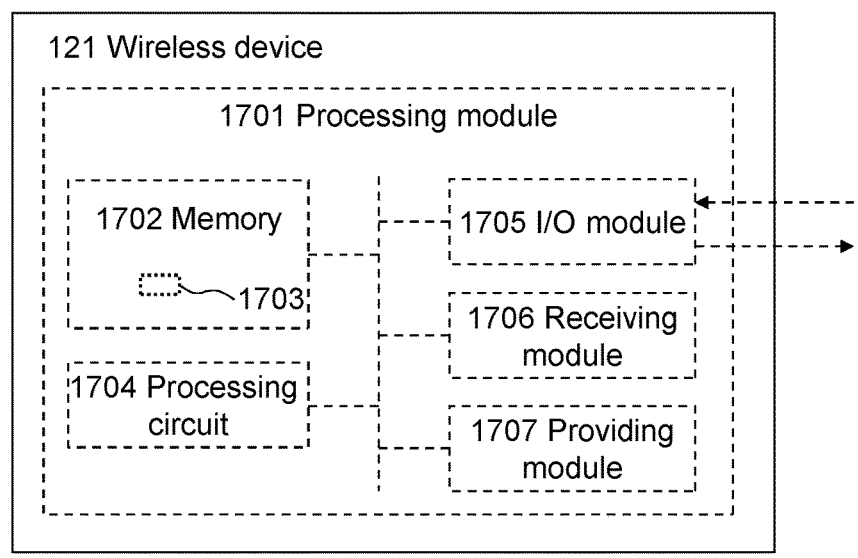
FIG. 17 is a functional block diagram for illustrating embodiments of the wireless device.

FIG. 17 is a schematic block diagram for illustrating embodiments of the wireless device 121, in particular how it may be configured to perform the method and/or one or more actions thereof as described herein, in particular the method and actions discussed above in relation to FIG. 16.

Hence, the wireless device 121 may comprise:

A processing module 1701, such as a means, one or more hardware modules, including e.g. one or more processors, and/or one or more software modules for performing said methods and/or actions.

A memory 1702 that may comprise, such as contain or store, a computer program 1703. The computer program comprises 'instructions' or 'code' directly or indirectly executable by the wireless device 121 so that it performs the said methods and/or actions. The memory 1702 may comprise one or more memory units and may be further be arranged to store data, such as configurations and/or applications involved in or for performing functions and actions of embodiments herein.

A processing circuit 1704 as an exemplifying hardware module and may comprise or correspond to one or more processors. In some embodiments, the processing module 1701 may comprise, e.g. 'is embodied in the form of' or 'realized by' the processing circuit 1704. In these embodiments, the memory 1702 may comprise the computer program 1703 executable by the processing circuit 1704, whereby the wireless device 121 is operative, or configured, to perform said method and/or actions.

An Input/Output (I/O) module 1705, configured to be involved in, e.g. by performing, any communication to and/or from other units and/or nodes, such as sending and/or receiving information to and/or from other external nodes or devices. The I/O module 1705 may be exemplified by an obtaining, e.g. receiving, module and/or a sending module, when applicable.

The wireless device 121 may also comprise other exemplifying hardware and/or software module(s), such as one or more of a receiving module 1706 and a providing module 1707, which module(s) may be fully or partly implemented by the processing circuit 1704.

Hence, the wireless device 121 and/or the processing module 1701 and/or the receiving module 1706 and/or the I/O module 1705 may be operative, or configured, to receive, from the radio network node 110 comprised in the wireless communication system 100, said radio signal based on GMSK modulation of said downlink data. The modulation applying a negative modulation index selected based on a type of the wireless device 121 being target for the downlink data.

Moreover, the wireless device 121 and/or the processing module 1701 and/or the providing module 1707 may be operative, or configured, to provide said user data based on the received radio signal.

FIGS. 17a-c are schematic drawings illustrating embodiments relating to a computer program that may be the computer program 1503 or 1703, and that comprises instructions that when executed by the processing circuit 1504 or 1704, and/or the processing module 1504 or 1702, causes the radio network node 110 or the wireless device 121 to perform the respective method as described above.

Figure 18A:
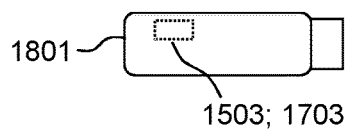
FIGS. 18*a-c* are schematic drawings illustrating embodiments relating to computer program products and computer programs.
Figure 18B:
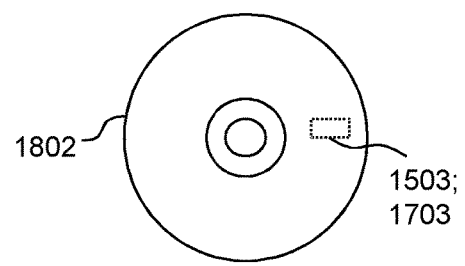
Figure 18C:
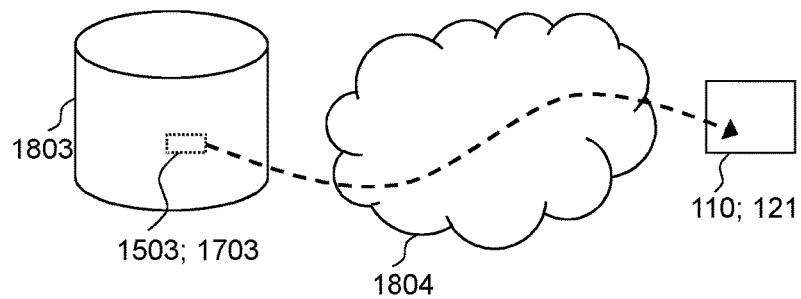

In some embodiments there is provided a computer program product, i.e. a data carrier, comprising a computer-readable medium and the computer program 1503 and/or 1703 stored on the computer-readable medium. By computer readable medium may be excluded a transitory, propagating signal and the computer readable medium may correspondingly be named non-transitory computer readable medium. Non-limiting examples of the computer-readable medium is a memory card or a memory stick 1801 as in FIG. 18a, a disc storage medium 1802 such as a CD or DVD as in FIG. 18b, a mass storage device 1803 as in FIG. 18c. The mass storage device 1803 is typically based on hard drive(s) or Solid State Drive(s) (SSD). The mass storage device 1803 may be such that is used for storing data accessible over a computer network 1805, e.g. the Internet or a Local Area Network (LAN).

The computer program 1503 and/or 1703 may furthermore be provided as a pure computer program or comprised in a file or files. The file or files may be stored on the computer-readable medium and e.g. available through download e.g. over the computer network 1805, such as from the mass storage device 1803 via a server. The server may e.g. be a web or File Transfer Protocol (FTP) server. The file or files may e.g. be executable files for direct or indirect download to and execution on the radio network node 110 and/or wireless device 121, e.g. by the processing circuit 1504 or 1704, may be for intermediate download and compilation to make them executable before further download and execution causing the radio network node 110 and/or wireless device 121 to perform the respective method as described above.

Note that any processing module(s) mentioned in the foregoing may be implemented as a software and/or hardware module, e.g. in existing hardware and/or as an Application Specific integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analog and digital circuits, and/or one or more processors configured with software and/or firmware, e.g. stored in memory, that, when executed by the one or more processors make the radio network node 110 and/or wireless device 121 to be configured to and/or to perform the above-described methods, respectively.

The term "network node" as used herein may as such refer to any type of radio network node (described below) or any network node, which may communicate with at least a radio network node. Examples of such network nodes include any radio network node stated above, a core network node (e.g. MSC, MME, etc.), Operations & Maintenance (O&M), Operations Support Systems (OSS), Self Organizing Network (SON) node, positioning node (e.g. E-SMLC), MDT etc.

The term "radio network node" as used herein may as such refer to any type of network node serving a wireless device, e.g. UE, and/or that are connected to other network node(s) or network element(s) or any radio node from which a wireless device receives signals. Examples of radio network nodes are Node B, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, nodes in distributed antenna system (DAS) etc.

The term "wireless device", and other terms referring to such device, e.g. "user equipment", "UE", "mobile station", "MS", may herein as such refer to any type of wireless device arranged to communicate with a radio network node in a wireless, cellular and/or mobile communication system, such as the wireless communication system 100, and may thus also e.g. be referred to as a wireless communication device. Examples include: target devices, device to device UE, device for MTC, machine type UE or UE capable of machine to machine (M2M) communication, PDA, iPAD, Tablet, mobile terminals, smart phone, laptop embedded equipped (LEE), laptop mounted equipment (LME), USB dongles etc. While said terms are used frequently herein for convenience, or in the context of examples involving other 3GPP nomenclature, it must be appreciated that the term as such is non-limiting and the teachings herein apply to essentially any type of wireless device. Note that with regard to the downlink, the term "transmitter" may be used herein to refer to a radio network node, e.g. base station, and the term "receiver" may refer to a wireless device.

The term "node" may be used herein for the sake of simplicity, in order to denote a node which may be a network node, a radio network node or a wireless device, as applicable.

Note that although terminology used herein may be particularly associated with and/or exemplified by certain cellular communication systems, wireless communication networks etc., depending on terminology used, such as wireless communication systems based on 3GPP and/or GSM, this should not be seen as limiting the scope of the embodiments herein to only such certain systems, networks etc. For example, although examples above to a great extent relate to GSM/EDGE, the basic principles described herein apply in general terms to also e.g. other systems where transmitters employ symbol constellation rotation between transmitted symbols.

As used herein, the term "memory" may refer to a hard disk, a magnetic storage medium, a portable computer diskette or disc, flash memory, random access memory (RAM) or the like. Furthermore, the memory may be an internal register memory of a processor.

Also note that enumerating terminology such as first network node, second network node, first wireless device, second wireless device, etc., as such should be considering non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number", "value" may be any kind of digit, such as binary, real, imaginary or rational number or the like. Moreover, "number", "value" may be one or more characters, such as a letter or a string of letters. Also, "number", "value" may be represented by a bit string.

As used herein, the expression "in some embodiments" has been used to indicate that the features of the embodiment described may be combined with any other embodiment disclosed herein.

As used herein, the expression "transmit" and "send" are typically interchangeable. These expressions may include transmission by broadcasting, uni-casting, group-casting and the like. In this context, a transmission by broadcasting may be received and decoded by any authorized device within range. In case of uni-casting, one specifically addressed device may receive and encode the transmission. In case of group-casting, e.g. multi-casting, a group of specifically addressed devices may receive and decode the transmission.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the present disclosure, which is defined by the appending claims.

The invention claimed is:

1. A method, performed by a wireless device operative in a wireless communication system, wherein the method comprises:
receiving, from a radio network node comprised in the wireless communication system, a radio signal based on Gaussian Minimum Shift Keying, "GMSK", modulation of downlink data, wherein the modulation applies a negative modulation index selected based on a type of the wireless device being targeted for the downlink data where the negative modulation index has been alternated with another modulation index separate from the negative modulation index so that alternating modulation indices are used in the modulation; and
providing user data based on the received radio signal.

2. The method as claimed in claim 1, wherein the wireless communication system is Global System for Mobile Communications, "GSM".

3. The method as claimed in claim 1, wherein the negative modulation index is −1/2.

4. The method as claimed in claim 1, wherein the alternating modulation indices are alternated between predetermined periods of transmission intervals.

5. The method as claimed in claim 4, wherein the predetermined periods are periods of multiframes, each multiframe being 51 Time Division Multiple Access, "TDMA", frames.

6. The method as claimed in claim 1, wherein the alternating modulation indices are alternated so that the alternation encodes information.

7. The method as claimed in claim 1, wherein the alternating modulation indices are associated with a respective identifier space.

8. The method as claimed in claim 1, wherein the negative modulation index is selected specifically for wireless devices of said type.

9. A wireless device configured to be operative in a wireless communication system, wherein the wireless device comprises:
- a processing circuit;
- memory for storing instructions executable by the processing circuitry, wherein the wireless device being configured to:
    - receive, from a radio network node comprised in the wireless communication system, a radio signal based on Gaussian Minimum Shift Keying, "GMSK", modulation of downlink data, wherein the modulation applies a negative modulation index selected based on a type of the wireless device being targeted for the downlink data where the negative modulation index has been alternated with another modulation index separate from the negative modulation index so that alternating modulation indices are used in the modulation; and
    - provide user data based on the received radio signal.

10. The wireless device as claimed in claim 9, wherein the wireless communication system is a Global System for Mobile Communications, "GSM".

11. The wireless device as claimed in claim 9, wherein the negative modulation index is −1/2.

12. The wireless device as claimed in claim 9, wherein the alternating modulation indices are alternated between predetermined periods of transmission intervals.

13. The wireless device as claimed in claim 12, wherein the predetermined periods are periods of multiframes, each multiframe being 51 Time Division Multiple Access, "TDMA", frames.

14. The wireless device as claimed in claim 9, wherein the alternating modulation indices are alternated so that the alternation encodes information.

15. The wireless device as claimed in claim 9, wherein the alternating modulation indices are associated with a respective identifier space.

16. The wireless device as claimed in claim 9, wherein the negative modulation index is selected specifically for wireless devices of said type.

* * * * *